United States Patent
Johns et al.

(10) Patent No.: US 6,421,053 B1
(45) Date of Patent: Jul. 16, 2002

(54) BLOCK RENDERING METHOD FOR A GRAPHICS SUBSYSTEM

(75) Inventors: Charles Ray Johns, Austin; John Samuel Liberty, Pflugerville; Brad William Michael, Cedar Park; John Fred Spannaus, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/316,097

(22) Filed: May 24, 1999

(51) Int. Cl.[7] .............................................. G06T 11/20
(52) U.S. Cl. ....................................................... 345/441
(58) Field of Search ................................. 345/441, 440

(56) References Cited

U.S. PATENT DOCUMENTS

| | | | | |
|---|---|---|---|---|
| 5,287,442 A | * | 2/1994 | Alcorn et al. ................ | 345/443 |
| 5,446,836 A | * | 8/1995 | Lentz et al. ................ | 345/441 |
| 5,598,517 A | * | 1/1997 | Watkins ....................... | 345/441 |
| 5,701,405 A | * | 12/1997 | Kelley et al. ................ | 345/441 |
| 5,758,128 A | * | 5/1998 | Larson ........................ | 345/530 |
| 5,870,105 A | * | 2/1999 | Jenson ........................ | 345/441 |
| 6,016,151 A | * | 1/2000 | Lin ............................... | 345/582 |
| 6,094,201 A | * | 7/2000 | Malamy et al. ............. | 345/441 |
| 6,236,408 B1 | * | 5/2001 | Watkins ....................... | 345/505 |
| 6,252,608 B1 | * | 6/2001 | Snyder et al. ............... | 345/473 |
| 6,285,376 B1 | * | 9/2001 | Choi et al. ................... | 345/441 |

OTHER PUBLICATIONS

"A Characterization of Ten Rasterization Techniques" Gharachorloo et al., Jul. 1989, Computer Graphics, vol. 23, No. 3, pp. 355–368.*

* cited by examiner

*Primary Examiner*—Jeffery Brier
*Assistant Examiner*—Ryan Yang
(74) *Attorney, Agent, or Firm*—Mark E. McBurney; Bracewell & Patterson, L.L.P.

(57) ABSTRACT

Primitives are divided into span groups of 2N spans, and then processed in M×N blocks of pixels, with the pixel blocks preferably being as close to square as possible and therefore optimized for small spans and texture mapping. Each span group is rendered block-by-block in a serpentine manner from an initial or entry block, first in a direction away from the long edge of the primitive and then in a direction towards the long edge. The interpolators include a one-deep stack onto which pixel and texel information for the initial or entry block are pushed before rendering any other blocks within the span group. Blocks or pairs of blocks within different span subgroups of the span group are then alternately rendered, such that rendering zig-zags between the span subgroups as it proceeds to the end of the span group. Once the first end of a span group is reached, the values for the initial or entry block are popped from the stack and rendering resumes from the initial or entry block in the opposite direction, but in the same serpentine or zig-zag manner, until the other end of the span group is reached. The next span group, if any, is rendered starting with a block adjacent to the last block rendered in the previous span group. Memory bandwidth utilization between the pixel and texel cache and the frame buffer is thus improved, together with texel reuse during texture mapping, to reduce the total number of pixel and texel fetches required to render the primitive.

19 Claims, 5 Drawing Sheets

BLOCK RENDERING METHOD FOR A GRAPHICS SUBSYSTEM

BACKGROUND OF THE INVENTION

1. Technical Field

The present invention relates in general to rendering in data processing system displays and in particular to rendering primitives processed as multiple blocks of pixels. Still more particularly, the present invention relates to improving efficiency in rendering textured primitives or small spans within primitives.

2. Description of the Related Art

Rendering is employed within data processing systems to create two dimensional images for display on a monitor. Typically, rendering includes processing geometric primitives (e.g., points, lines and polygons) to determine component pixel values for the monitor display, a process often referred to specifically as rasterization.

The pixels for the display area of a data processing system monitor are conventionally viewed as a matrix mapping to one or more frame buffers, or segments of memory holding a corresponding portion of the pixel information (Z, alpha, and color values, texture coordinates, deltas, etc.), and/or texture memory, containing texture elements or "texels" for a pixel position, which are utilized to generate or refresh the display screen.

Current graphic subsystems typically employ a multiple pixel interface to the frame buffer and texture memory in order to achieve the bandwidth necessary for rendering at acceptable speeds. For simplicity and costs reasons, these pixels are accessed in fixed groups usually organized as a span in the horizontal or vertical direction since most rendering algorithms are span based (that is, primitives are rendered one or more spans at a time). This organization and method of rendering is inefficient for small spans and textured primitives.

A common organization, for example, employs an eight pixel interface to the frame buffer, organized as eight consecutive pixels (an 8×1 block) from a single horizontal or vertical span. In such a system, rendering requires a separate frame buffer or cache access for each span, which is inefficient for primitives or portions of primitives ranging across spans of significantly less than eight pixels. Moreover, texture mapping requires eight texels for tri-linear mip-mapping—four pixels each from the two nearest mip-map levels—which are accessed and blended to calculate the texture for one pixel. With scan line organization, texel reuse during texture mapping may be virtually nonexistent.

It would be desirable, therefore, to provide a rendering method optimized for both small scan lines and texture mapping.

SUMMARY OF THE INVENTION

It is therefore one object of the present invention to provide improved rendering for data processing system displays.

It is another object of the present invention to provide improved rendering of primitives processed as multiple blocks of pixels.

It is yet another object of the present invention to provide improved efficiency in rendering textured primitives or small spans within primitives.

The foregoing objects are achieved as is now described. Primitives are divided into span groups of 2N spans, and then processed in M×N blocks of pixels, with the pixel blocks preferably being as close to square as possible and therefore optimized for small spans and texture mapping. Each span group is rendered block-by-block in a serpentine manner from an initial or entry block, first in a direction away from the long edge of the primitive and then in a direction towards the long edge. The interpolators include a one-deep stack onto which pixel and texel information for the initial or entry block are pushed before rendering any other blocks within the span group. Blocks or pairs of blocks within different span subgroups of the span group are then alternately rendered, such that rendering zig-zags between the span subgroups as it proceeds to the end of the span group. Once the first end of a span group is reached, the values for the initial or entry block are popped from the stack and rendering resumes from the initial or entry block in the opposite direction, but in the same serpentine or zig-zag manner, until the other end of the span group is reached. The next span group, if any, is rendered starting with a block adjacent to the last block rendered in the previous span group. Memory bandwidth utilization between the pixel and texel cache and the frame buffer is thus improved, together with texel reuse during texture mapping, to reduce the total number of pixel and texel fetches required to render the primitive.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
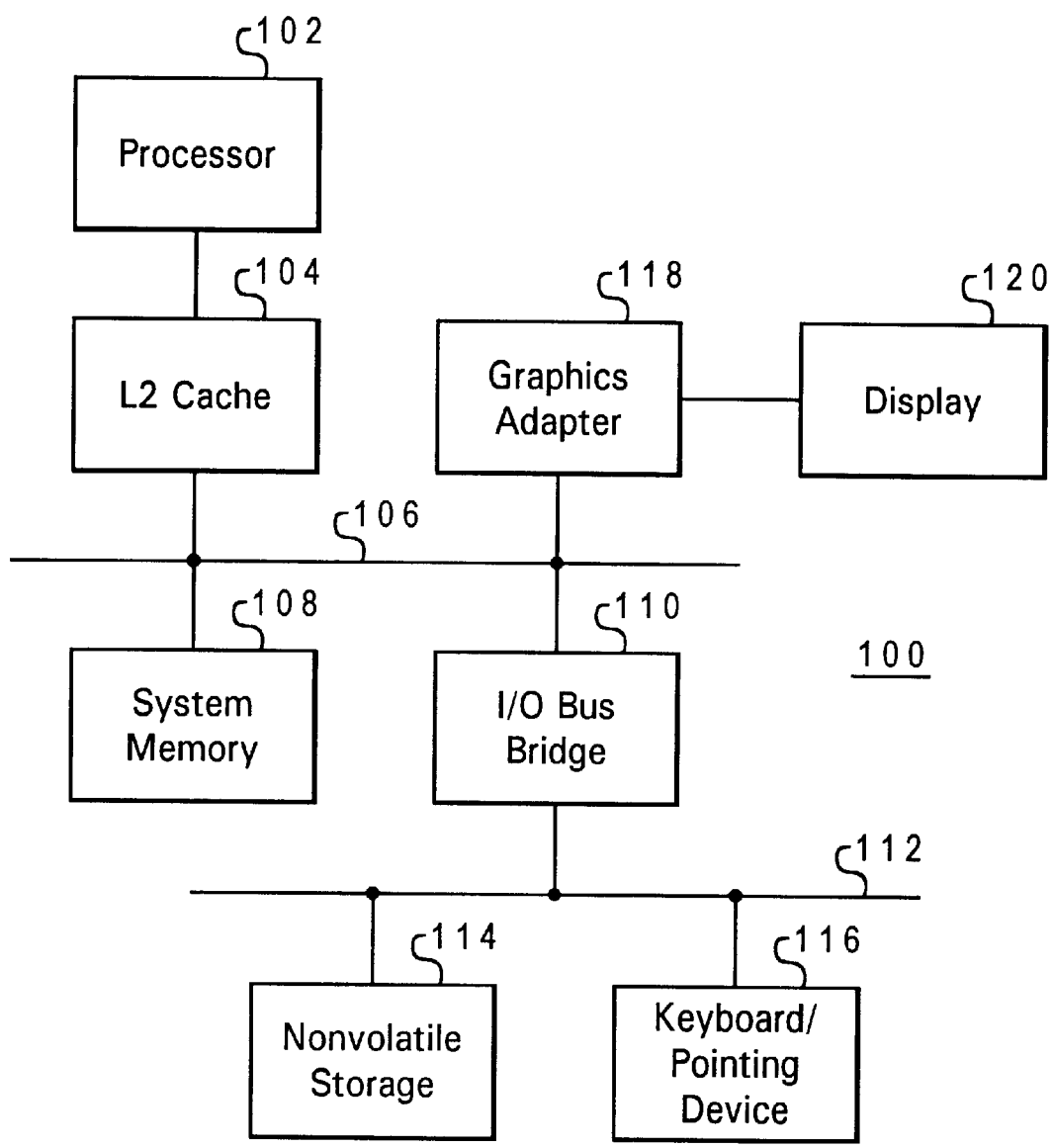
FIG. 1 depicts a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100, which may be any of the data processing systems available from International Business Machines Corporation of Armonk, New York, includes a processor 102 connected, in the exemplary embodiment, to a level two (L2) cache 104, which is connected in turn to a system bus 106.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, and keyboard/pointing device 116, which may include a conventional mouse, a trackball, or a digitizer pad, are connected to I/O bus 112.

In a preferred embodiment, data processing system 100 includes graphics adapter 116 connected to system bus 106, receiving primitives for rendering from processor 102 and generating pixels for display 120 as described in further detail below. However, those skilled in the art will recognize that a graphics adapter is not necessary and rendering in accordance with the present invention may be performed within the remainder of data processing system 100 utilizing processor 102 for computations and a portion of system memory 108 for the frame buffer. However, the present invention is preferably implemented in a data processing system including a graphics adapter having a back end configuration similar to that described below.

The exemplary embodiment shown in FIG. 1 is provided solely for the purposes of explaining the invention and those skilled in the art will recognize that numerous variations are possible, both in form and function. For instance, data processing system 100 might also include a graphics or display processor, the frame buffer may be implemented as video random access memory (VRAM) either within the data processing system or on graphics adapter 118, and a look-up table and/or digital-to-analog converter may be implemented between graphics adapter 118 and display 120. All such variations are believed to be within the spirit and scope of the present invention.

Figure 2A:
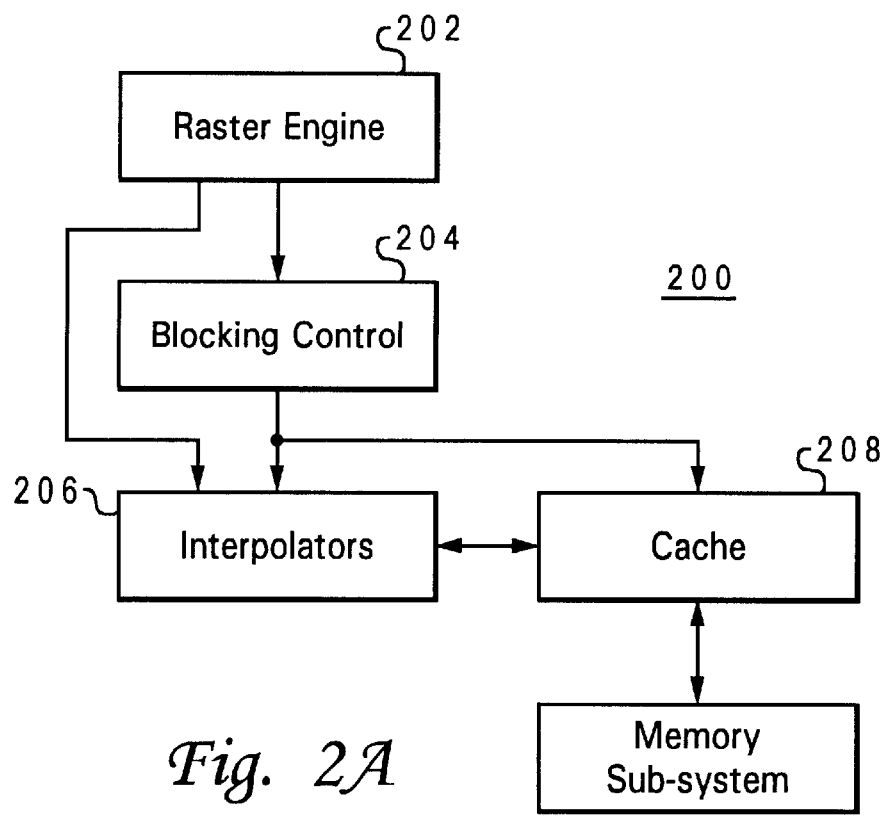
FIGS. 2A–2B are diagrams for a graphics subsystem rendering primitives in accordance with a preferred embodiment of the present invention.
Figure 2B:
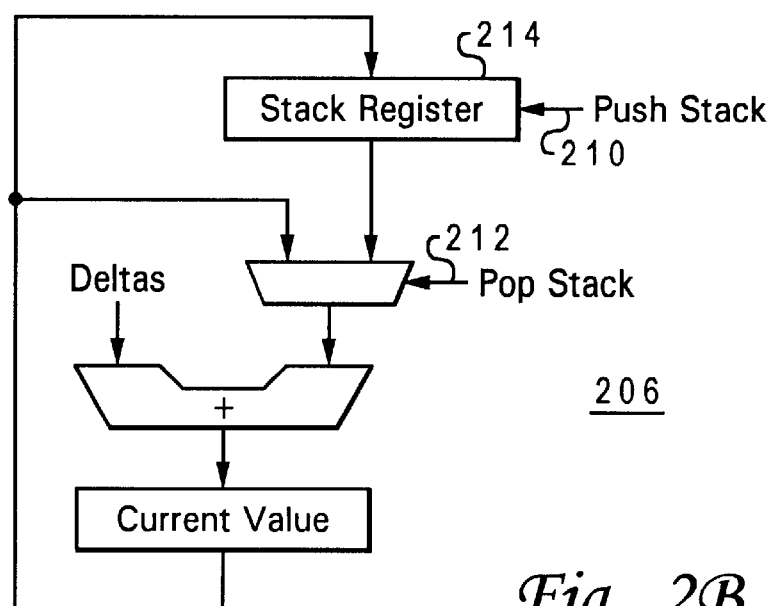

With reference now to FIGS. 2A–2B, diagrams for a graphics subsystem rendering primitives in accordance with a preferred embodiment of the present invention is illustrated. Graphics subsystem 200 shown in FIG. 2A is preferably implemented within a graphics adapter, and includes a raster engine 202, blocking control logic 204, interpolators 206, and a pixel and texel cache 208 coupled to the memory subsystem (e.g., system memory) of the data processing system.

Raster engine 202 is coupled to both blocking control logic 204 and to interpolators 206. Raster engine 202 receives primitives for rendering, and breaks the primitives into scan lines in the horizontal or vertical direction.

Raster engine 202 generates groups of scan lines to be rendered, with each group containing one to four scan lines. Each group preferably includes four (2N) scan lines, with a last group including the remaining scan lines if the total number of scan lines is not evenly divisible by four. It should be noted that the span groups should be generated on 4 (or 2N) scan line boundaries from the edge of the display area rather than from the edge of the primitive to be rendered, which implies that both the first and/or the last scan group may contain fewer than 4 (2N) spans.

The groups of scan lines are transferred to blocking control logic 204 together with hints on rendering direction and which edge of the primitive is the long edge. The rendering direction typically proceeds from a primitive vertex or span one scan line at a time to the opposite end of the polygon (e.g., stepwise by scan line or group of scan lines from top to bottom in the display across the polygon, with each scan line rendered from left to right). Scan lines are also referred to as spans, a term used inter-changeably to refer to a scan line or the series of adjacent pixels which make up a scan line. The long edge of the primitive from the initial vertex or span at which rendering begins may be readily determined by simple equations for line length.

Blocking control logic 204 is coupled to both interpolators 206 and pixel and texel cache 208. Blocking control logic 204 converts each group of scan lines into 4×2 (M×N) blocks of pixels. In the exemplary embodiment, this corresponds exactly to the size of a cache line within pixel and texel cache 208, each cache line holding data for eight pixels. Blocking control logic 204 also manages the Z, alpha, color and texture interpolators 206.

Interpolators 206, which are illustrated in greater detail in FIG. 2B, control pixels information, the initial values, and the deltas employed to calculate the current values for Z, alpha, color, texture coordinates, etc. for the current rendering block. While only a single interpolator is illustrated in FIG. 2B, a graphics subsystem may actually include eight interpolators, one for each pixel in a block.

Interpolators 206 include controls consisting of positive and negative (X,Y) steps, push stack 210 and pop stack 212, and draw block. Interpolators 206 contain a one deep stack within stack register 214 in the exemplary embodiment, which is utilized during rendering as described below. Depending upon the design, the stack could be more than one deep. For instance, a two deep stack might be utilized to limit the number of page crossings when the span group is larger than 4 spans.

Blocking control logic 204 utilizes the hints on rendering direction and long edge received from raster engine 202 to render the blocks defining a primitive in the most efficient order. Blocking control logic 204 provides the pixel and texel cache 208 with the (X,Y) address of each block to be rendered. Cache 208 employs the address information to determine if the pixel information (i.e., Z, alpha, color, texture, etc.) for rendering the current block is valid within the cache 208. If not, cache 208 requests the missing information from the memory subsystem.

In the present invention, a primitive to be rendered is first broken into groups of four spans, which are then decomposed into 4×2 blocks. The first span group is rendered from an initial block including the initial vertex or span of the primitive to a second block immediately below the initial block, then block-by-block in a zig-zag fashion from the second block along the span group in a direction away from the long edge of the primitive, and finally block-by-block in a zig-zag fashion from the second block along the span group in a direction towards the long edge of the primitive.

It should be noted that the next block rendered after the initial block need not necessarily lie below the initial block. The next block is adjacent (up, down, left, or right) of the initial block in a direction depending on the direction in which the spans are generated (either up, down, left or right) and on the shape of the primitive. In the exemplary embodiment, spans are presumed to be generated from the top down.

Each subsequent span group is rendered from an entry block below the last block rendered in the previous span group, then block-by-block in a zig-zag fashion from the entry block along the span group in a direction away from the long edge of the primitive, and finally block-by-block in a zig-zag fashion from the entry block along the span group in a direction towards the long edge of the primitive.

The rendering scheme of the present invention results in a serpentine rendering pattern. The primitive is first broken down into groups of four spans, which are then decomposed into 4×2 blocks of pixels. The blocks are then rendered in a serpentine pattern in a direction away from the long edge of the primitive, alternately rendering one or two blocks of pixels from each two-span subgroup of a given four span group.

The first span group rendered for a primitive is rendered from the initial block of pixels including a vertex of the primitive (or, alternatively, the block of the initial span of the polygon which includes the long edge of the polygon), then down, with the block of pixels below the initial block being rendered, then in zig-zag fashion along the span subgroups in the direction away from the long edge. If necessary, the first span group is then rendered from the block of pixels below the entry block in the direction towards the long edge.

Each subsequent span group in the primitive is rendered from an entry block of pixels adjacent the last block of pixels rendered in the last previously-rendered span group, then along the spans from the entry block in the direction away from the long edge, then along the spans from the entry block in the direction towards the long edge. Only one or two blocks of pixels may remain to be rendered within a span group after rendering the spans from the entry block in the direction away from the long edge.

At selected blocks within the primitive—the block below the initial block in the first scan group and the entry block in each subsequent scan group—interpolation values are pushed onto the stack to allow for continuing the rendering of the spans in the opposite direction. Once all blocks in a current direction (away from the long edge) are rendered, the stack is popped and blocks are rendered in the same zig-zag or serpentine fashion in the opposite direction, toward the long edge of the primitive.

When all blocks within the current span group are rendered, the interpolators are moved in the rendering direction (across the spans) to setup for the next span group. The next span group is started with the block of pixels adjacent the last block rendered in the previous scan group. The draw control is provided to avoid rendering blocks which do not contain part of a span.

Figure 3:
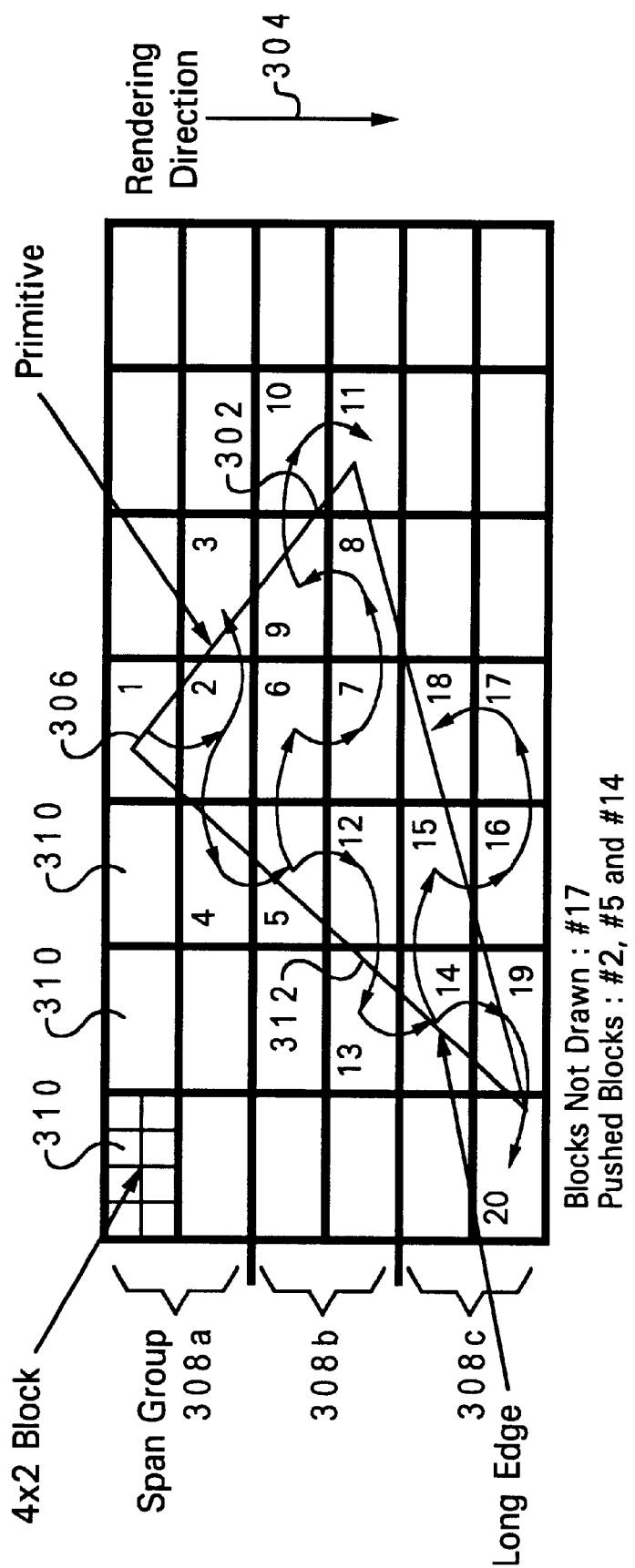
FIG. 3 depicts a diagram for rendering an example primitive in accordance with a preferred embodiment of the present invention.

With reference now to FIG. 3, a diagram for rendering an example primitive in accordance with a preferred embodiment of the present invention is depicted. A triangular primitive 302 is to be rendered in a direction 304 starting with the uppermost vertex 306. As described above, primitive 302 is first divided into span groups 308a–308c of four scan lines, which are then divided into a number of 4×2 blocks 310.

Blocks 310 within primitive 302 are then rendered in serpentine fashion, starting with the initial block 1 which includes the starting vertex 306 of the primitive 302 and lies within a first group of spans 308a to be rendered. If rendering of the polygon began with a span instead of a vertex, the initial block would be that closest to the long edge of the polygon.

Rendering of the example primitive 302 then proceeds down to block 2, adjacent to block 1 but in a different span subgroup than that including block 1, and then to block 3, in the direction away from long edge 312. If necessary, rendering would proceed along the scan lines, with two blocks 310 of one span subgroup being alternately rendered with two blocks of the other span subgroup in the same group of spans, in zig-zag fashion until the end of the spans are reached.

Before proceeding from block 2 to block 3, interpolation values for block 2 are pushed onto the stack to allow rendering to continue from block 2 in the opposite direction, toward the long edge 312. Thus, after block 3 is rendered, the stack is popped and the rendering direction is reversed, with rendering proceeding from block 2 to block 4. If necessary, rendering would again proceed along the scan lines, this time in the direction toward the long edge of the primitive, with two blocks 310 of one span subgroup being alternately rendered with two blocks of the other span subgroup in the same zig-zag fashion described above until the end of the spans are reached.

The next group of spans 308b is then rendered beginning with an entry block, block 5, adjacent the last block rendered in the previous span group, block 4. Before rendering proceeds from block 5, the interpolation values for block 5 are pushed onto the stack for later use. Rendering proceeds from block 5 in the serpentine fashion through blocks 6 through 11, in the direction away from the long edge of the primitive until the opposite end of the span group is reached.

The values for block 5 are then popped from the stack and rendering proceeds from block 5 in the opposite direction to the end of the span group including the long edge, which includes blocks 12 and 13 in the example primitive 302. Rendering of the next span group 308c begins with an entry block, block 14 adjacent the last block rendered (block 13) in the prior span group 308b.

The pixel and texel information for block 14 are pushed onto the stack. Blocks 15 through 18 are rendered as shown, with the draw control employed to suppress rendering of block 17, which does not contain any part of the example primitive 302. This may occur for some primitives since in the preferred embodiment there are cases where 4×2 blocks must be touched but which do not contain pixels to be rendered. This may be eliminated by allowing diagonal steps (i.e., steps in both the X and Y directions)—which could be employed to avoid visiting block 17 and having to suppress rendering—but at the cost of complicating the inter-polators. Pixel and texel information for block 14 is next popped from the stack, and blocks 19 and 20 are rendered.

Figure 4:
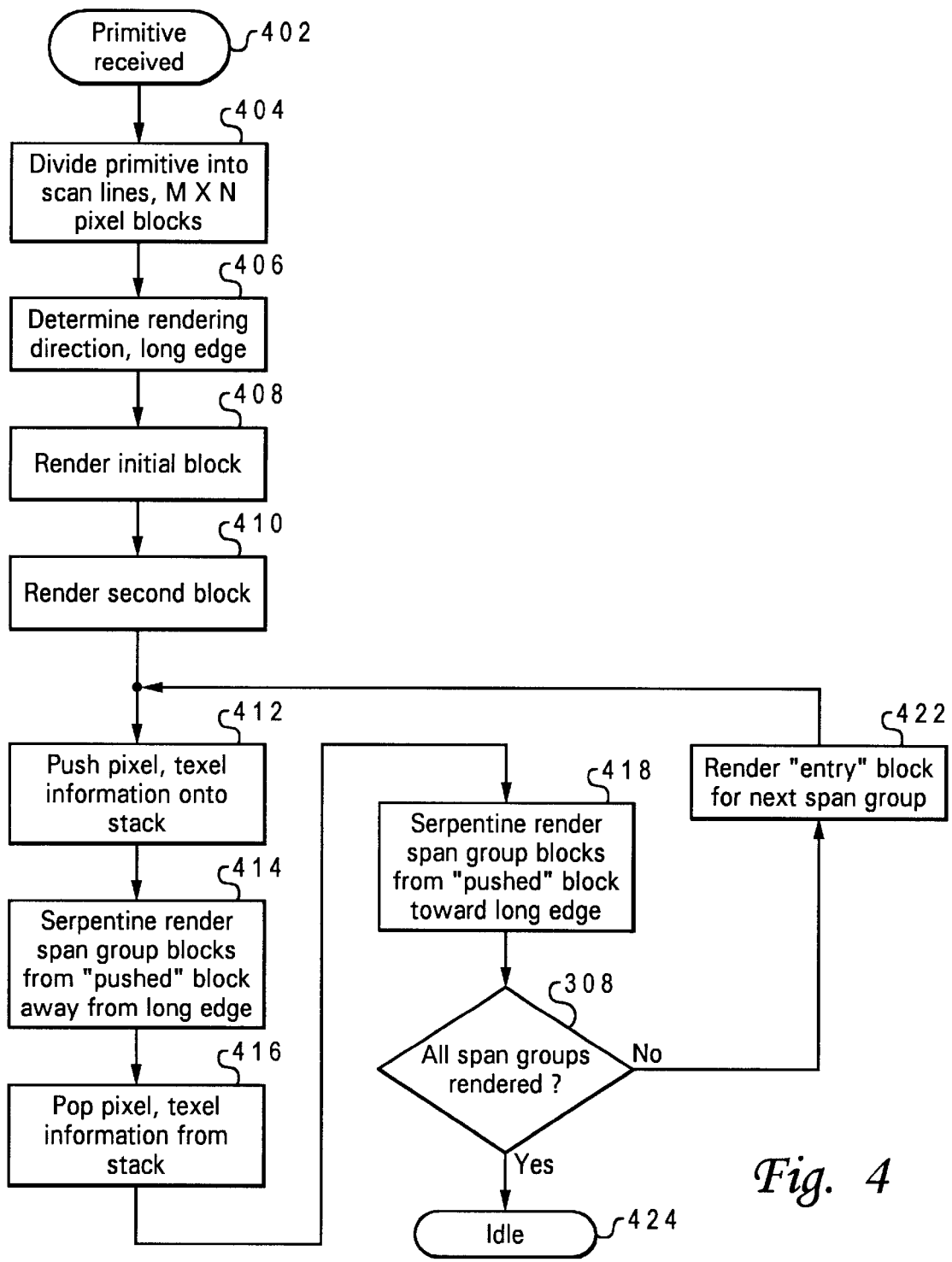
FIG. 4 is a high level flow chart for a process of rendering primitives in accordance with a preferred embodiment of the present invention.

Referring to FIG. 4, a high level flow chart for a process of rendering primitives in accordance with a preferred embodiment of the present invention is illustrated. The process begins at step 402, which depicts a primitive being received for rendering. The process then passes to step 404, which illustrates the primitive being divided into scan line groups of 2N scan lines, and then into M×N blocks of pixels.

The process next passes to step 406, which depicts the rendering direction and the long edge of the primitive being determined, and then to step 408, which illustrates rendering an initial block within the primitive. The initial block should lie within a first span subgroup of the first 2N span group to be rendered. The process passes next to step 410, which depicts rendering a second block adjacent the initial block but within another span subgroup for the first 2N span group of the primitive, and then to step 412, which illustrates pushing the pixel and texel information for the just-rendered block onto the stack.

The process then passes to step 414, which depicts rendering blocks within the span group from the "pushed" block within the span group in a serpentine order, zig-zagging between span subgroups forming the 2N span group, in the direction away from the long edge of the primitive until the end of the span group is reached. The process next passes to step 416, which illustrates popping the pixel and texel information for the pushed block from the stack, and then to step 418, which illustrates rendering blocks within the span group from the pushed block in serpentine order in the opposite direction, towards the long edge of the primitive, until the end of the span group is reached.

The process next passes to step 420, which depicts a determination of whether all span groups within the primitive have been rendered. If not, the process proceeds to step 422, which illustrates rendering an entry block within the next span group, adjacent the last block rendered within the last span group, and then returns to step 412 for the pixel and texel information for the just-rendered block onto the stack, with the just-rendered block becoming the new "pushed" block. Steps 414 through 420 are then repeated.

Once a determination is made in step 420 that the last scan group for the primitive has been rendered, the process proceeds instead to step 424, which illustrates the process becoming idle until another primitive is received for rendering.

The present invention addresses the inefficiencies of prior art rendering methods by rendering a primitive utilizing an M×N block of pixels (in prior art methods either M or N would typically be "1"), making the block close to a square, which optimizes the rendering method for both small spans and for reuse of fetched texels. Although the exemplary embodiment employs 4×2 blocks of pixels, the invention does not require a specific block size. Additionally, the method of the present invention may be applied to other rendering techniques besides span generation, such as, for example, flood fill algorithms. The paint alogrithm along with a two deep stack may also be employed to render a large primitive with a minimal number of page crossings.

The invention also does not require a separate raster engine generating spans, but may be applied to any rendering method with the raster engine and blocking control logic combined to generate blocks instead of spans. Separate pixel engines or interpolators may operate in parallel on each pixel within an M×N block.

Memory bandwidth utilization for a system including an 8 pixel interface to the frame buffer and a corresponding pixel and texel cache line size is improved with the 4×2 organization of the present invention over 8×1 methods known in the art. This may be shown by considering a hypothetical 50 pixel quadrilateral (two triangles, or a trapezoid) rendered using both organizations. The trapezoid should include approximately seven spans, with an average of 3.5 pixels per span for each of the two triangle forming the trapezoid. In the 8×1 organization, 14 memory accesses corresponding to 112 pixels accessed would be required to render the 50 pixels, an efficiency of 44%. In the 4×2 organization of the present invention, only 10 memory accesses, corresponding to a total of 80 pixels accessed, would be required to render the 50 pixels, a 62.5% efficiency. Thus, the 4×2 organization of the present invention has approximately 20% efficiency gain over the prior art 8×1 organization. Furthermore, this improvement in efficiency is not entirely lost as the primitive size increases or decreases.

Another benefit of the block rendering method of the present invention is reduction of frame buffer memory page crossings. Assuming the memory tile (the page of memory mapped to a rectangle on the screen) is at least twice the height of the selected 4×2 block and at least equal to the width of the block, the number of page crossings required to render a primitive is reduced by 75%. Elimination of the intermediate span generation by combining the block rendering and span generation would further reduce the number of memory page crossings.

Figure 5:
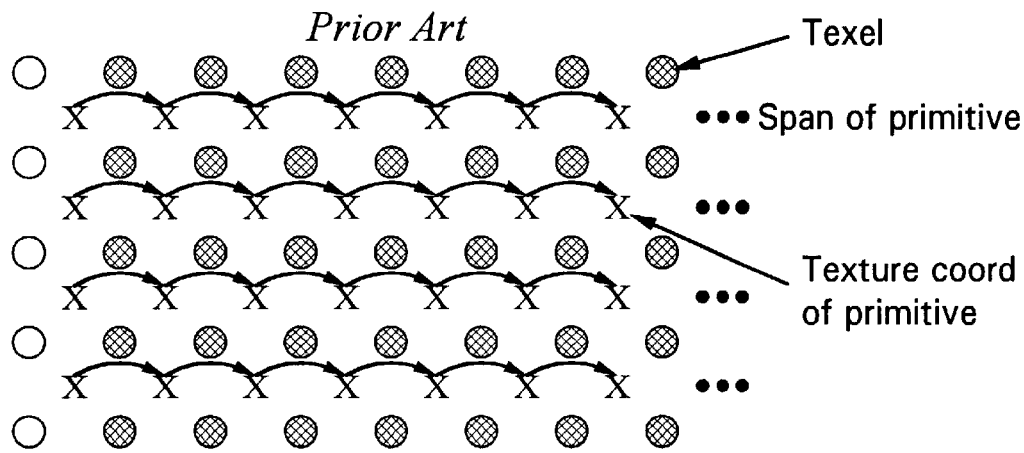
FIG. 5 depicts improved texel reuse during block rendering in accordance with a preferred embodiment of the present invention as compared to prior art scan line rendering.
Figure 5:
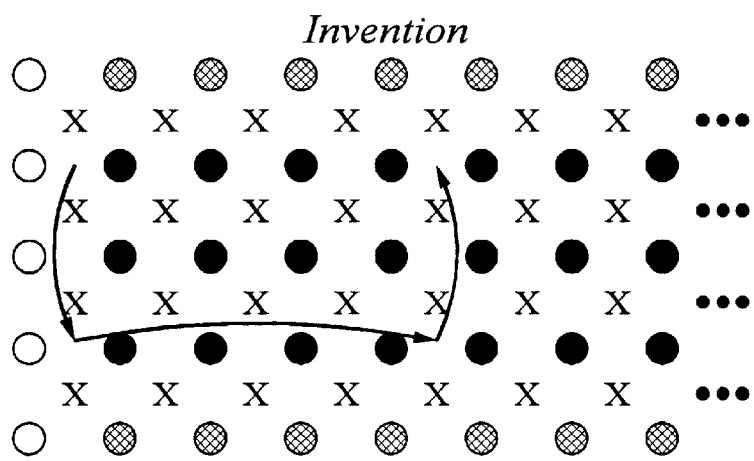

With reference to FIG. 5, improved texel reuse during block rendering in accordance with a preferred embodiment of the present invention as compared to prior art scan line rendering is depicted. Most contemporary graphics subsystems already access texture memory as blocks of texels and utilize an on-chip texture cache. Rendering a polygon in square or close to square patches improves utilization of the texture cache, since texture mapping requires eight texels to calculate the texture of one pixel in tri-linear mip-mapping.

FIG. 5 depicts 28 pixels for which texture is rendered utilizing both scan line rendering as known in the art and serpentine block rendering of the present invention. Assuming the spans are long enough to begin flushing texels from the cache, 64 texels must be fetched for scan line rendering of the 28 pixels while only 40 must be fetched for the serpentine block rendering method, a 37.5 reduction in texel fetches. This is merely exemplary of the potential performance advantage, and actual reduction in texel fetches required will be highly dependent on the primitive being rendered and the texture map coordinates and parameters involved.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of rendering a primitive, comprising:

dividing a primitive into groups of spans each including at least two subgroups of spans;

rendering each group of spans along the spans from an entry in a direction away from a long edge of the primitive, including alternately rendering blocks of pixels from different subgroups of spans while rendering along the spans by the steps of:

(a) rendering a block of pixels within a subgroup of spans;

(b) rendering a block of pixels adjacent a block of pixels last rendered and within a same subgroup of spans as the block of pixels last rendered;

(c) rendering a block of pixels within a different subgroup of spans adjacent the block of pixels rendered in step (b);

(d) repeating steps (b) and (c) until all blocks of pixels within a current group of spans in a current rendering direction have been rendered; and rendering each group of spans along the spans from the entry in a direction toward the long edge of the primitive.

2. A method of rendering a primitive, comprising:

dividing a primitive into groups of four spans;

rendering each group of spans along the spans from an entry in a direction away from a long edge of the primitive; and rendering each group of spans along the spans from the entry in a direction toward the long edge of the primitive.

3. The method of claim 2, wherein the step of rendering each group of spans along the spans from an entry in a direction away from a long edge of the primitive further comprises:

alternately rendering one or two 4×2 blocks of pixels from different subgroups of two spans within a group of spans while rendering along the spans.

4. The method of claim 1, wherein the step of rendering each group of spans along the spans from an entry in a direction away from a long edge of the primitive further comprises:

rendering a first group of spans from a block of pixels including a vertex of the primitive in the direction away from the long edge; and after rendering the first group of spans from the block of pixels including the vertex in the direction away from the long edge, rendering the first group of spans, if necessary, from the block of pixels including the vertex in the direction towards the long edge.

5. The method of claim 4, wherein the step of rendering each group of spans along the spans from an entry in a direction away from a long edge of the primitive further comprises:

rendering each group of spans subsequent to the first group of spans:
from an entry block of pixels adjacent a last block of pixels rendered in a previous group of spans in the direction away from the long edge; and
after rendering from the entry block of pixels in the direction away from the long edge, rendering from the entry block of pixels in the direction towards the long edge if necessary.

6. The method of claim 1, wherein the step of rendering each group of spans along the spans from an entry in a direction away from a long edge of the primitive further comprises:

rendering each group of spans in M×N blocks of pixels.

7. The method of claim 6, wherein the step of rendering each group of spans in M×N blocks of pixels further comprises:

rendering each group of spans in 4×2 blocks of pixels.

8. A system for rendering a primitive, comprising:

blocking control logic dividing a primitive into span groups each including 2N spans, and further dividing the span groups into M×N blocks of pixels; and one or more interpolators rendering each span group along the spans from an entry in a direction away from a long edge of the primitive and then from the entry in a direction toward the long edge of the primitive, wherein the one or more interpolators render the span groups block-by-block in a serpentine order along the spans each span group includes two subgroups of N spans and the one or more interpolators render no more than two blocks within a given span subgroup before rendering at least one block within a different span subgroup.

9. The system of claim 8, further comprising:

a graphics adapter containing the blocking control logic and the one or more interpolators.

10. The system of claim 8, further comprising:

a data processing system including a display; and a graphics adapter within the data processing system and containing the blocking control logic and the one or more interpolators, the graphics adapter rendering the primitive for the display.

11. The system of claim 8, wherein the one or more interpolators each include an at least one-deep stack onto which pixel and texel information for an entry block in a span group is pushed before rendering other blocks within the span group.

12. The system of claim 11, wherein the entry block is an initial block within a first span group including a vertex for the primitive.

13. The system of claim 11, wherein the entry block is an block within a span group adjacent to a last rendered block within a previous span group.

14. The system of claim 11, wherein the pixel and texel information for the entry block is popped from the stack after rendering the span group from the entry block in the direction away from the long edge to a first end of the span group and before rendering the span group from the entry block in the direction towards the long edge to a second, opposite end of the span group.

15. A computer program product within a computer usable medium for rendering a primitive, comprising:

instructions for rendering a group of blocks within a primitive block-by-block in a serpentine order from an entry block in a direction away from a long edge of the primitive; and instructions for rendering the group of blocks block-by-block in the serpentine order from the entry block in a direction towards the long edge of the primitive instructions for logically dividing the primitive into M×N blocks of pixels and into groups of blocks, wherein each group of blocks includes two parallel rows of blocks spanning the primitive.

16. A computer program product within a computer usable medium for rendering a primitive, comprising:

instructions for rendering a group of blocks within a primitive block-by-block in a serpentine order from an entry block in a direction away from a long edge of the primitive; and instructions for rendering the group of blocks block-by-block in the serpentine order from the entry block in a direction towards the long edge of the primitive including instructions for rendering no more than two blocks within one row of blocks in the group of blocks before rendering at least one block within another row of blocks in the group of blocks.

17. A computer program product within a computer usable medium for rendering a primitive, comprising:

instructions for rendering a group of blocks within a primitive block-by-block in a serpentine order from an entry block in a direction away from a long edge of the primitive; and instructions for rendering the group of blocks block-by-block in the serpentine order from the entry block in a direction towards the long edge of the primitive including instructions for zig-zagging between two rows of blocks in the group of blocks while rendering the group of blocks.

18. A computer program product within a computer usable medium for rendering a primitive, comprising:

instructions for rendering a group of blocks within a primitive block-by-block in a serpentine order from an entry block in a direction away from a long edge of the primitive; and instructions for rendering the group of blocks block-by-block in the serpentine order from the entry block in a direction towards the long edge of the primitive wherein the instructions for rendering a group of blocks within a primitive block-by-block in a serpentine order from an entry block in a direction away from a long edge of the primitive further comprise:

instructions for rendering the entry block first in the group of blocks; and instructions for pushing pixel and texel information for the entry block onto a stack before rendering any other block within the group of blocks.

19. A computer program product within a computer usable medium for rendering a primitive, comprising:

instructions for rendering a group of blocks within a primitive block-by-block in a serpentine order from an entry block in a direction away from a long edge of the primitive;

instructions for rendering the group of blocks block-by-block in the serpentine order from the entry block in a direction towards the long edge of the primitive; and instructions for popping pixel and texel information for the entry block from a stack after rendering all blocks in the group of blocks from the entry block in the direction away from the long edge and before rendering any block within the group of blocks from the entry block in the direction towards the long edge.

* * * * *